Dec. 15, 1931.  C. NIEMANN ET AL  1,836,767
AGRICULTURAL MACHINE
Filed Feb. 27, 1929   2 Sheets-Sheet 1
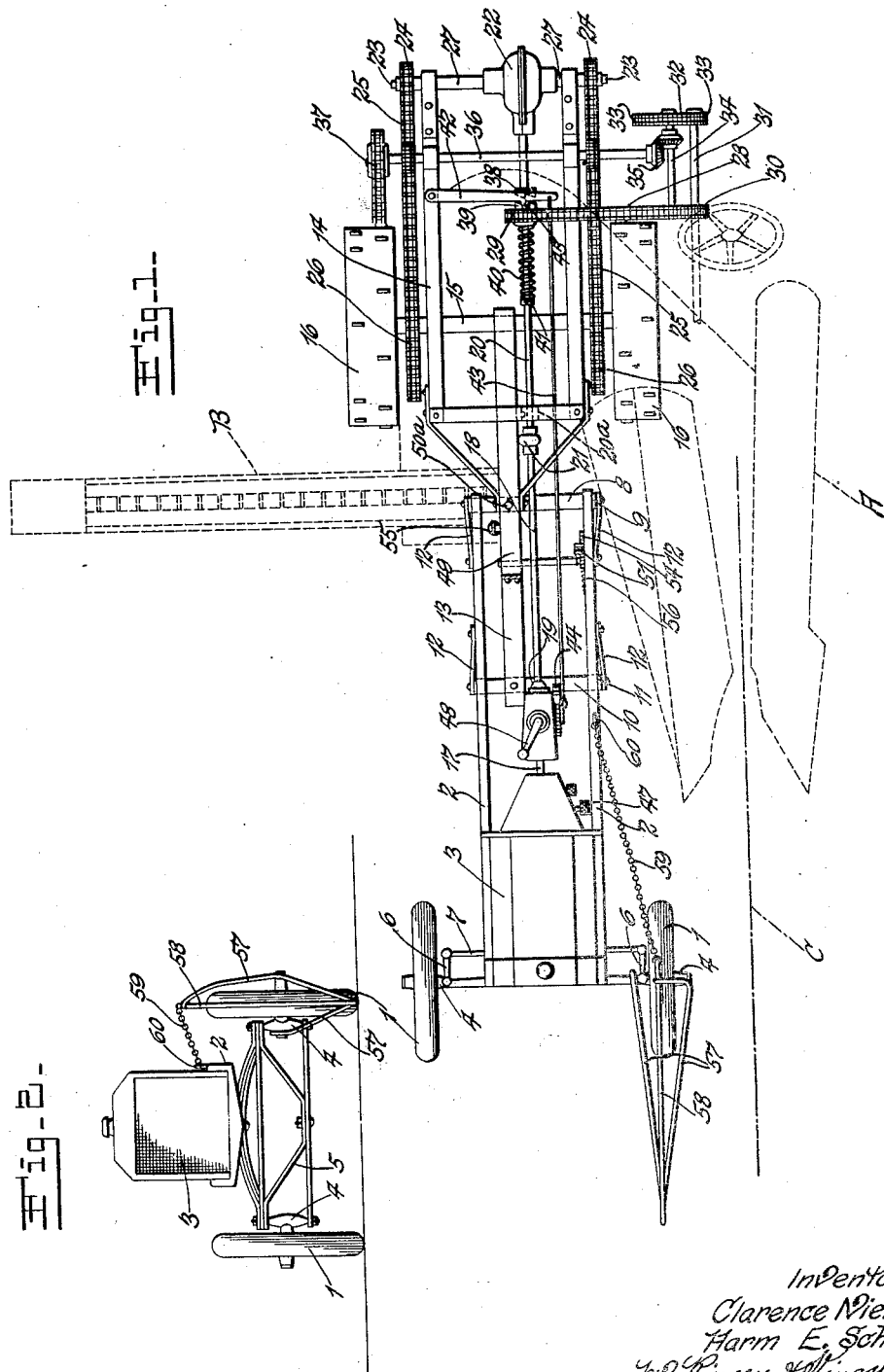
Inventors.
Clarence Niemann,
Harm E. Schmidt,
by Rupsey & Kingsland.
Their Attorneys.

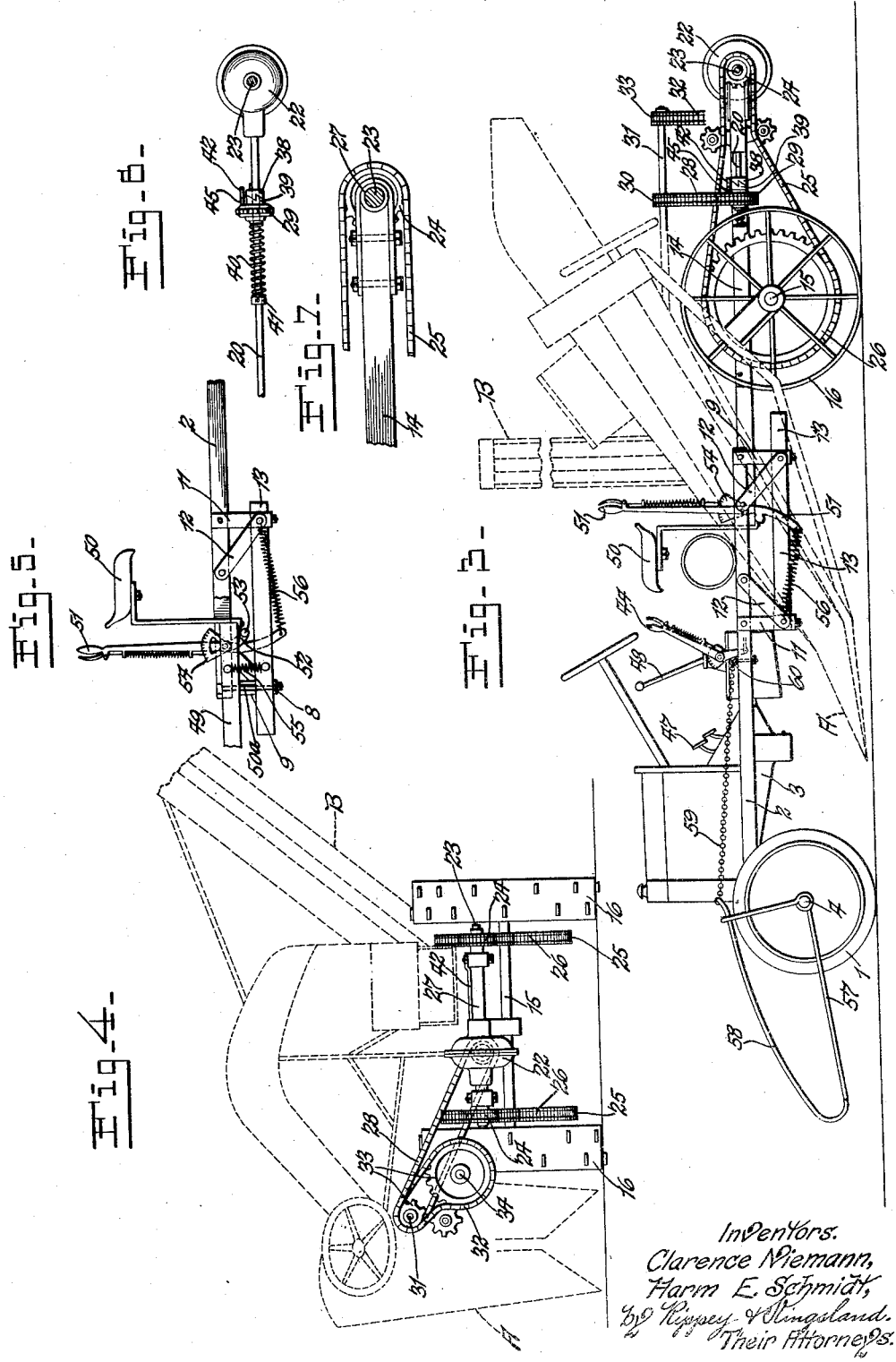

Patented Dec. 15, 1931

1,836,767

UNITED STATES PATENT OFFICE

CLARENCE NIEMANN AND HARM E. SCHMIDT, OF LITCHFIELD, ILLINOIS

AGRICULTURAL MACHINE

Application filed February 27, 1929. Serial No. 342,973.

This invention relates to agricultural machines, and an object of the invention is to provide means for utilizing the engine and a part of the frame of an automobile of usual construction as the engine and supporting frame therefor, in combination with improved means for cooperatively attaching a farm implement or machine to said frame for operation by said engine.

Another object of the invention is to provide means for combining a skeletonized frame of an automobile to the frame of a farm machine in a compact relationship whereby the wheels of the farm machine may be driven by the engine of the automobile, the entire machine being so compact in structure and light in weight that it may be turned on short radius and may also be operated over comparatively soft ground without damage or injury to the ground. By this construction we obtain the decided advantage of being able to operate this machine under extreme weather and ground conditions under which it is impossible to operate the usual heavy tractors to which the farm implements and machines are connected by long coupling connections.

Another object of the invention is to provide means whereby most of the usual horse drawn farm implements may be connected to the frame of our power driven machine.

Another object of the invention is to provide a machine of the type and character mentioned which may be turned in a much smaller space than the machines utilizing tractors and long coupling connections for the farm implements; which may be reversed and backed; which is of such light construction that it may be driven over soft ground without damage or injury to the ground, and which is steered and controlled easily and may be constructed so that it may be connected with most farm implements without great expense.

Other objects will appear from the following description, reference being made to the accompanying drawings, in which Fig. 1 is a plan view of our improved machine, parts of a corn picker being shown in order to facilitate explanation, though it must be understood that the invention is equally adapted for use in connection with other farm implements.

Fig. 2 is a front end elevation of the machine.

Fig. 3 is a left side elevation of the machine.

Fig. 4 is a rear end elevation.

Fig. 5 is a right hand side elevation of the control device for tilting the farm implement.

Fig. 6 is a detailed view of the clutch and control lever whereby the farm implement may be operated during travel of the machine, or not as desired.

Fig. 7 is a detailed view showing a suitable means for supporting the differential driving gear in connection with the farm implement.

The dotted line structure A will be recognized as part of a familiar type of corn picker whereby the corn is picked from the stalks and, after being husked, is discharged from the machine through a chute B°. The line C designates a row of corn along which the machine is to be operated to pick the ears from the stalks.

We modify the construction whereby the front wheels 1 of an automobile are assembled in connection with the usual automobile frame comprising the frame side members 2, without disturbing the location of the engine 3. These front wheels 1 constitute the supporting wheels for the front of the machine and are controlled by any appropriate type of steering mechanism, as will be readily understood without specific description. However, we have shown the pivoted elements 4 of the wheels assembled at the ends of a cross frame 5 and provided with rearwardly extended arms 6 connected by a rod 7 designed and adapted to be moved in one direction or the other to steer the wheels.

The rear ends of the two frame side members 2 are connected by a rigid element comprising a bar 8 having upwardly extended ends 9 which are attached to the ends of the frame side members 2. Forwardly from the member 8—9 the frame side members 2 are connected by another rigid member 10 having upwardly extending ends 11 fastened to the frame members 2. These cross connections are strengthened and braced by braces 12 having their upper ends attached to the frame side members 2 and their lower ends attached to the members 8 and 10 respectively. A longitudinal bar 13 rests upon the cross members 8 and 10 and is rigidly attached thereto. These parts, comprising the rear ends of the frame side members 2 and the connections between said frame side members, constitute a frame in connection with the power mechanism for attachment to the front end of a farm implement, such as the corn picker shown.

The mechanisms and devices of the farm implement for performing the intended functions of said implement are supported by the usual frame 14 mounted on an axle 15 attached to the wheels 16, so that when the machine is in motion the axle 15 is rotated. The present invention comprises mechanism for driving or rotating the axle 15 and thereby the wheels 16 by connections positively driven by the engine 3. Said connections comprise the transmission shaft 17, a shaft section 18 connected to the rear end of the shaft 17 by a flexible joint 19 and to the front end of a shaft 20 by a flexible joint 21. The rear end of the shaft 20 is geared to the usual type of differential gearing 22 for conveniently rotating the two rear axle members 23 in the familiar manner, and the front end of said shaft 20 is in a hanger bearing 20ª on the frame 14. Each axle member 23 has attached thereto a sprocket wheel 24 connected by a chain 25 with a large sprocket wheel 26 on the axle 15. The axle sections 23 are mounted in axle housings 27, as is usual. This differential gearing 22, the axle members 23, and the axle housings 27 may be the usual parts removed from the rear of an automobile to construct our improved machine. That is to say, we can employ a used or second-hand automobile and modify it to produce our improved agricultural machine. By so doing, we are enabled to make use of the usual power mechanism of the automobile, the steering mechanism, the differential mechanism, the forward and reverse shift mechanism and the variable speed mechanism, so that very few new parts must be provided in case it is desired to construct the machine from a used or second-hand automobile. However, it must be clear that our invention is not restricted to the use of the used or second-hand parts. For, if desired, the machine may be constructed as a new machine without using old parts.

We provide a power take-off from the shaft 20, and means for controlling the same to operate the mechanisms and devices of the farm implement when the machine is in motion. That is to say, this power take-off may be controlled to operate the farm implement when the machine is in motion, or not, as desired. A sprocket chain 28 engages a sprocket wheel 29 loosely mounted on the shaft 20, and also engages a sprocket wheel 30 mounted on a shaft 31 which, by means of a sprocket chain 32 and wheels 33, rotates the shaft 34 of the picker mechanism A in a known manner. For the present case, it is sufficient to explain that the shaft 34 is a part of the operating mechanism or devices of a farm implement, the specific type of the farm implement being immaterial. Gearing 35 constitutes means for driving a shaft 36 from the shaft 31, and connections 37 constitute means for operating the device or mechanism B from the shaft 36.

A clutch member 38 is rigid on the shaft 20 and is designed and adapted for engagement with a clutch member 39 on the hub of the sprocket wheel 29. A spring 40, mounted on the shaft 20, has one end abutting a collar 41 rigid on said shaft 20 and the opposite end abutting the hub of the sprocket wheel 29. The power and energy of this spring may be utilized to actuate and to move the sprocket wheel 29 in a direction and to an extent to engage the clutch member 39 with the clutch member 38. Obviously, when these two clutch members are engaged, the mechanisms A and B will operate when the machine is traveling.

A lever 42 has one end pivoted to the frame 14 and the opposite end connected with the rear end of a rod or other suitable connection 43, the front end of which is connected with the lower end of a lever 44. The lever 42 extends alongside the sprocket wheel 29 and has a rounded shoulder 45 contacting with said sprocket wheel so that when the connection 43 is moved forwardly, the sprocket wheel 29 will be moved away from and out of clutch engagement with the clutch member 38, leaving the shaft 20 free to rotate without operating the farm implement, and permitting the farm implement to travel without operation of any of the mechanisms or devices of said implement. The lever 44 is equipped with a latch device 46 for holding said lever set in its different adjustments. That is to say, this latch device will hold the lever positively in a position to prevent the clutch member 39 from engaging the clutch member 36, and will also hold the lever 44 in a position in which the clutch members 39 and 38 are in clutching engagement.

The machine has a clutch pedal 47 which controls rotation of the shaft 17 by the engine, which may be operated to permit the engine to run without rotating the shaft 17, or to cause the engine to rotate said shaft 17, as desired. The machine is equipped with a variable speed shift lever 48 which is also operative to reverse the direction of the shaft 17 by the engine, so as to enable the machine to be backed.

The rear end of the frame for the power device supports the front end of the frame for the farm implement. A tongue or reach 49 is rigid with and projects forwardly from the front end of the frame 14 of the farm implement proper into the rear portion of the frame of the power device, and supports a seat 50 for the driver, so that the driver rides the machine in convenient position to operate the levers 44 and 48 as well as the clutch pedal 47. A bolt 50ª extends through the tongue 49 and into the bar 13 and forms strong connection between the implement and the motor frames. A lever 51 is pivoted to one of the frame side members 2 and has a downwardly extended arm 52 supporting a lateral projection 53 upon which the front end of the tongue or reach 49 is supported. Obviously, by moving the lever 51 in one direction the front end of the tongue or reach 49 will be raised, and by moving the lever 51 in the opposite direction the front end of said tongue or reach 49 will be lowered. Thus, the farm implement may be raised or lowered or tilted, as desired and as may be required to cause said machine to function properly. The lever 51 may be latched in its different adjustments by a latch device 54. The weight and resistance of the operation of the lever 51 to tilt and control the farm implement as described is minimized by a spring 55 connecting the front end of the tongue or reach 49 with the frame member 13, and by a spring 56 connecting the lower end of the lever 51 with a rigid part of the frame so as to cooperate with the operator in moving the lever 51 in a direction to raise the tongue or reach 49. The power and energy of these springs is regulated and adjusted so that not much force is required to operate said lever 51.

When the machine is used as a corn picker it may be, and preferably is, equipped with a device to raise bent over stalks so that they will not be missed by the picker. For this purpose we equip that side of the front end of the machine which is toward the row C with a device for raising bent over stalks. Said device comprises a pair of arms 57 pivotally connected with the axis of the front wheel 1 that is toward the row C, and an arm 58 bent from one of the arms 71 so as to provide a rounded front end for this frame (Fig. 3). When the machine is in operation the rounded front end of this frame slides along the ground and, since the arm 58 inclines upwardly and rearwardly, the bent over stalks will be raised to position to be engaged by the finger mechanism. When the machine is traveling and not working, this frame may be supported above the ground by a connection 59 from the rear end of the arm 58 to a stationary part 60 of the machine.

When any farm implement is to be connected to the power mechanism of the machine, the tongue or reach 49 is arranged and located as shown, and the shaft section 18 is used to connect the shaft 17 with the shaft 20. In traveling from place to place, the lever 44 is set in position to hold the clutch member 39 disengaged from the clutch member 38. This will permit the engine to operate to drive the machine along the road, or elsewhere, without operating the mechanisms A or B. When it is desired to operate said mechanisms A and B the lever 44 is moved to an adjustment to permit the spring 40 to engage the clutch member 39 with the clutch member 38; so that, when the machine travels, both the mechanisms A and B will be operated. However, the engine may be kept running without operating these mechanisms by adjustment of the pedal 47 in a position to permit the engine to idle. The machine may be caused to travel at variable speeds, or to move backwardly by familiar operation of the lever 48. The farm implement may be tilted by operation and adjustment of the lever 51 and the fallen over stalks may be raised by the frame comprising the parts 57 and 58.

From the foregoing it must be apparent that our invention comprises mechanism for operating farm implements economically; and, when desired, a power driven farm implement may be assembled and provided by means of used or second-hand automobile parts. We have used this machine with a high degree of satisfaction and have found that, because of the compact assembly, we are able to turn on a very much shorter radius than is possible where tractors and long coupling devices therefrom are used to operate farm implements. Indeed, we are able to take a standard farm implement constructed for horse power and, with very little cost, transform and convert the same into a power driven machine possessing more advantages than many of the specially constructed farm machines now on the market. This machine is very light, comparatively. It does not tear up or damage the land as do many of the heavy tractor-operated machines now on the market. In numerous other respects this machine is a genuine advance and improvement and obtains all of its intended objects in a highly satisfactory and efficient manner. Of course, we do not restrict ourselves unessentially or specifically in any respect, other than as set forth in the appended claims.

We claim:—

1. An agricultural machine comprising an engine, a rigid chassis frame for supporting said engine, and front wheels supporting the front end of said chassis frame, in combination with an agricultural implement, a rigid frame for said implement separate from said chassis frame, wheels supporting said rigid frame, a detachable device for holding the rear and front ends respectively of said chassis frame and said rigid frame in overlapped relationship, differential driving mechanism supported by said rigid frame for rotating said wheels of said implement, and a shaft driven by said engine and extending through both of said frames for driving said differential mechanism.

2. An agricultural machine comprising an engine, a rigid chassis frame for supporting said engine, and front wheels supporting the front end of said chassis frame, in combination with an agricultural implement, a rigid frame for said implement separate from said chassis frame, wheels supporting said rigid frame, a detachable device for holding the rear and front ends respectively of said chassis frame and said rigid frame in overlapped relationship, differential driving mechanism supported by said rigid frame for rotating said wheels of said implement, a shaft driven by said engine and extending through both of said frames for driving said differential mechanism, and mechanism supported by said chassis frame and cooperating with the overlapped portion of said implement frame for tilting said implement.

3. An agricultural machine comprising an engine, a frame on which said engine is rigidly mounted, front wheels supporting the front end of said frame, an agricultural implement frame separate from said first frame and having its front end overlapping the rear end of said first frame, wheels supporting said implement frame, and detachable means for holding said frames in said overlapping relationship and for driving said implement wheels from said engine.

4. An agricultural machine comprising an engine, a frame on which said engine is rigidly mounted, front wheels supporting the front end of said frame, an agricultural implement frame separate from said first frame and having its front end overlapping the rear end of said first frame, wheels supporting said implement frame, detachable means for holding said frames in overlapped relationship and permitting tilting of said implement frame, differential mechanism supported by said implement frame for driving the wheels of said implement frame, and a flexible shaft device driven by said engine for driving said differential mechanism.

5. A machine of the character described comprising an automobile frame having the rear wheels removed, in combination with an agricultural implement frame separate from said automobile frame and having its front end overlapping the rear end of said automobile frame, and detachable mechanism for holding said frames in said overlapped relationship and for driving the machine.

6. A machine of the character described comprising an automobile frame having the rear wheels and differential mechanism removed therefrom, an engine supported by said frame, a shaft driven by said engine, an agricultural implement, a frame for said implement separate from said automobile frame and having its front end overlapping said automobile frame, wheels for said implement frame, differential mechanism supported by said implement frame, detachable means for driving said differential mechanism from said shaft and for holding said frames in said overlapped relationship and permitting detachment of said implement from said automobile frame, and means for driving said implement wheels by said differential mechanism.

7. A machine of the character described comprising an automobile frame having the rear wheels and differential mechanism removed therefrom, an engine supported by said frame, a shaft driven by said engine, an agricultural implement, a frame for said implement separate from said automobile frame and having its front end overlapping said automobile frame, wheels for said implement frame, differential mechanism supported by said implement frame, detachable means for driving said differential mechanism from said shaft and for holding said frames in said overlapped relationship and permitting detachment of said implement from said automobile frame, means for driving said implement wheels by said differential mechanism, and means for tilting said implement frame.

CLARENCE NIEMANN.
HARM E. SCHMIDT.